(12) United States Patent
Berthou

(10) Patent No.: US 7,595,787 B2
(45) Date of Patent: Sep. 29, 2009

(54) SECURED DATA INPUT DEVICE

(75) Inventor: Nicolas Berthou, Aze (FR)

(73) Assignee: Thales, Paris (FR)

( * ) Notice: Subject to any disclaimer, the term of this patent is extended or adjusted under 35 U.S.C. 154(b) by 454 days.

(21) Appl. No.: 10/450,627

(22) PCT Filed: Dec. 18, 2001

(86) PCT No.: PCT/FR01/04040

§ 371 (c)(1),
(2), (4) Date: Jun. 17, 2003

(87) PCT Pub. No.: WO02/054423

PCT Pub. Date: Jul. 11, 2002

(65) Prior Publication Data

US 2004/0036676 A1 Feb. 26, 2004

(30) Foreign Application Priority Data

Dec. 28, 2000 (FR) .................................. 00 17228

(51) Int. Cl.
G09G 5/00 (2006.01)
G06F 3/033 (2006.01)
G09G 5/08 (2006.01)
G06F 3/02 (2006.01)

(52) U.S. Cl. ........................ 345/156; 345/161; 345/167; 345/168

(58) Field of Classification Search ......... 345/156–182; 382/124
See application file for complete search history.

(56) References Cited

U.S. PATENT DOCUMENTS 5,684,466 A * 11/1997 Keating et al. ............... 340/662
5,973,673 A * 10/1999 Hodson ...................... 345/158
6,148,094 A * 11/2000 Kinsella ..................... 382/124
6,504,269 B1 * 1/2003 Miyajima et al. ........... 307/131

FOREIGN PATENT DOCUMENTS

CH 679 083 A 12/1991
FR 2 183 712 A 12/1973
NL 1 004 982 C 12/1997

* cited by examiner

Primary Examiner—Srilakshmi K Kumar
(74) Attorney, Agent, or Firm—Lowe Hauptman Ham & Berner, LLP

(57) ABSTRACT

The invention relates to the making safe of a device for inputting data to an item of equipment. The invention is of particular use in the aeronautical field, for example in order to validate data relating to flight conditions.

The invention proposes data validation means, of nature different from that of the data input means themselves.

For this purpose, the device comprises means (5) for detecting the presence of an operator inputting data and validation means (9) making it possible to take account of the data only if a contact with the operator is detected.

18 Claims, 4 Drawing Sheets

SECURED DATA INPUT DEVICE

The invention relates to a device for inputting data to an item of equipment, for example electronic equipment. The device comprises a mobile member intended to be moved by an operator. The entered data being a function of the movement of the mobile member. The mobile member can, for example, be formed by a key of a keyboard, a rotary knob or a track ball.

Certain data is very sensitive and therefore requires safe data input. By way of example, in the aeronautical field, the data relating to flight conditions, like the altitude or vertical speed commands, is very sensitive. Instabilities in the input of this data, due for example to vibrations, can result in involuntary modifications of the data, which can be very prejudicial to the control of an aircraft.

An input of data can be validated by a double movement of the mobile member. For example, the input of data carried out with the use of a rotary knob can be made safe by the pushing in of this knob. This double movement is complicated to use and sometimes impossible when, for example, all of the possible movements of a mobile member are used for inputting data.

The purpose of the invention is to simplify the making safe of a data input device by proposing means for validating input data, means having a nature different from that of the input means themselves.

For this purpose, the invention relates to a device for inputting data to an item of equipment comprising a mobile member intended to be moved by an operator, the input data being dependent on the movement of the mobile member, characterized in that the device furthermore comprises:

- detection means providing information representing the existence or non-existence of a contact between the operator and the mobile member,
- validation means receiving said information and said input data, and in that the validation means supply said input data to the equipment only when the information represents the existence of a contact between the operator and the mobile member.

The data input is in this case a mechanical movement of the mobile member. The validation of input data uses information which is not a movement but a simple contact between the operator and the mobile member. The fact that the actions necessary for data input and validation are of different nature, on the one hand a mechanical movement and on the other had a contact, makes it possible to make the data input safe. In fact, if the actions were of the same nature, for example two movements, a single external interference, such as for example a vibration, would be capable of inputting an erroneous item of data and of validating it.

Advantageously, the contact with the operator, detected by the detection means, is the normal contact the operator makes in order to move the mobile member. Thus it is not necessary for the operator to carry out a mechanical action other than the one necessary for the movement of the mobile member.

The invention will be better understood and other advantages will become apparent on reading the detailed description of several embodiments of the invention, this description being illustrated by the appended drawing in which.

For the sake of simplicity in the continuation of the description, the same objects will bear the same references in the different figures.

Figure 1:
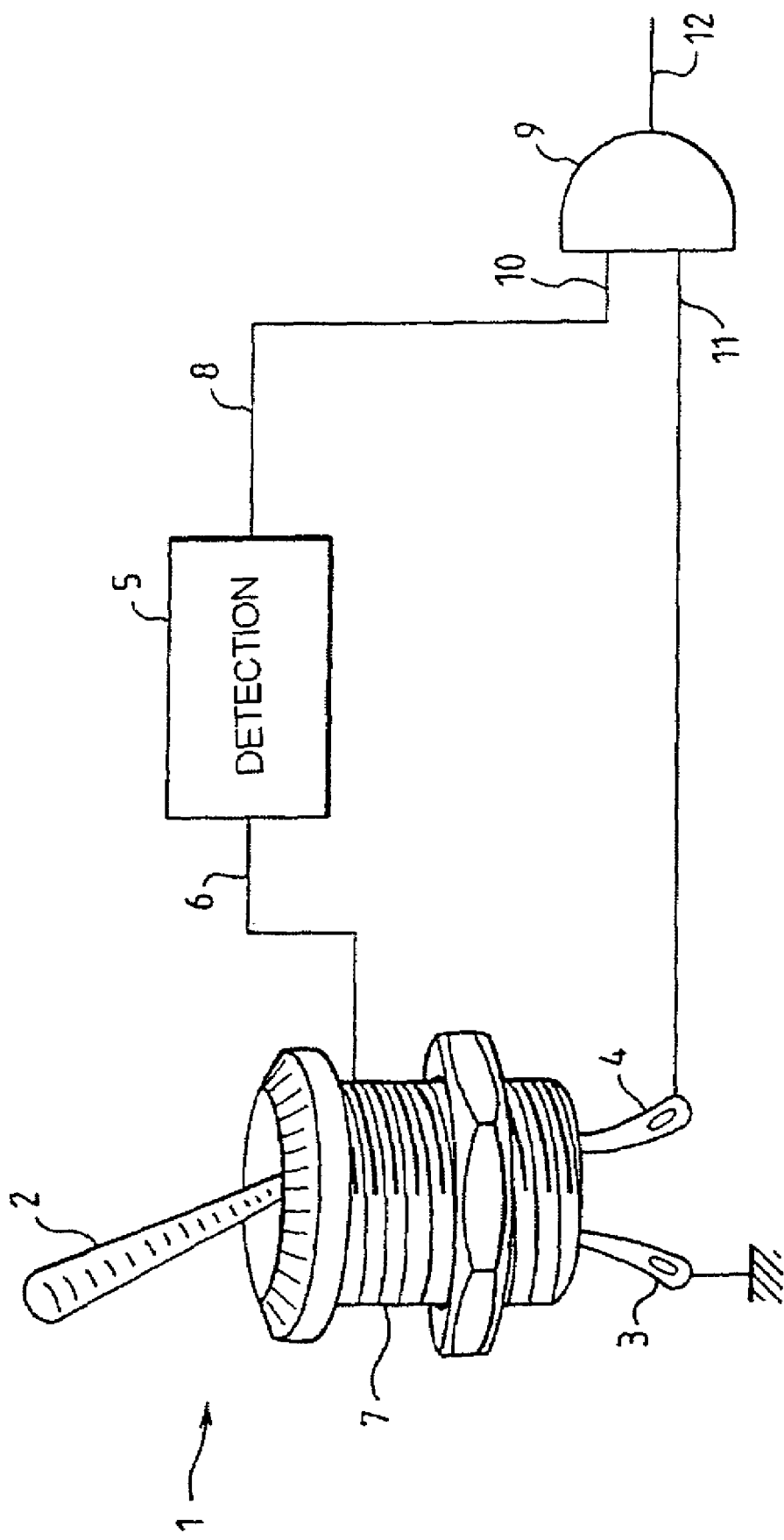
FIG. 1 is a diagrammatic representation of the means of the invention.

The device shown in FIG. 1, represents a switch 1, for example a two-position switch. The switch comprises two terminals 3 and 4 one of which, terminal 3 for example, is connected to ground. When the operator maneuvers the mobile member 2, he connects or does not connect the terminal 4 to ground.

The device furthermore comprises detection means 5 providing information representing the existence or non-existence of a contact between the operator and the mobile member 2. The mobile member 2 is, for example, metallic or comprises on its outer surface an electrically conductive material.

The mobile member 2 is electrically connected to an input 6 of the detection means 5, for example by the intermediary of the body 7 of the switch 1. The human body, on this occasion that of the operator, can be assimilated electrically as a resistance of the order of two kilohms. Thus, when a hand of the operator is in contact with the mobile member 2, the input 6 is grounded through the intermediary of the equivalent resistance of the operator's human body. The detection means 5 comprise an output 8 upon which they supply information representing the existence or non-existence of a contact between the operator and the mobile member 2.

The device furthermore comprises validation means 9 represented by an AND gate. A first input 10 of the validation means 9 receives the information delivered by the detection means 5 on the output 8. A second input 11 of the validation means 9 receives data representing the position of the mobile member 2. In FIG. 1, the second input 11 is connected or not connected to ground by the intermediary of the terminal 4, depending on the position of the mobile member 2. The validation means 9 deliver, on an output 12, the data present on the second input 11 when the detection means 5 supply information representing the existence of a contact between the operator and the mobile member 2.

In other words, the data supplied by the switch 1 is validated only when the operator touches the mobile member 2. This makes it possible to prevent an erroneous modification of the data, without an action by the operator, from being taken into account by an item of equipment receiving the data present on the output 12. An erroneous modification can be, for example, due to a vibration undergone by the switch 1.

The invention also provides a difference in nature between the way in which data is input, in this case it is a matter of a mechanical movement of the mobile member 2, and the way in which the data is validated, in this case it is a matter of detecting the presence of the operator. This difference in nature improves the safety of the data input device. In fact, when the input of data and its validation are provided by means of the same nature, for example mechanical, a single disturbance, for example a vibration, can affect both the input of data and the validation of that data. The invention therefore makes it possible to avoid this problem.

Advantageously, as long as the detection means 5 have not detected the presence of an operator, the validation means 9 maintain, on their output 12, the data present on the input 11 at the time of the last detection of presence of the operator by the detection means 5. This function can be provided by the validation means 9.

Figure 2:
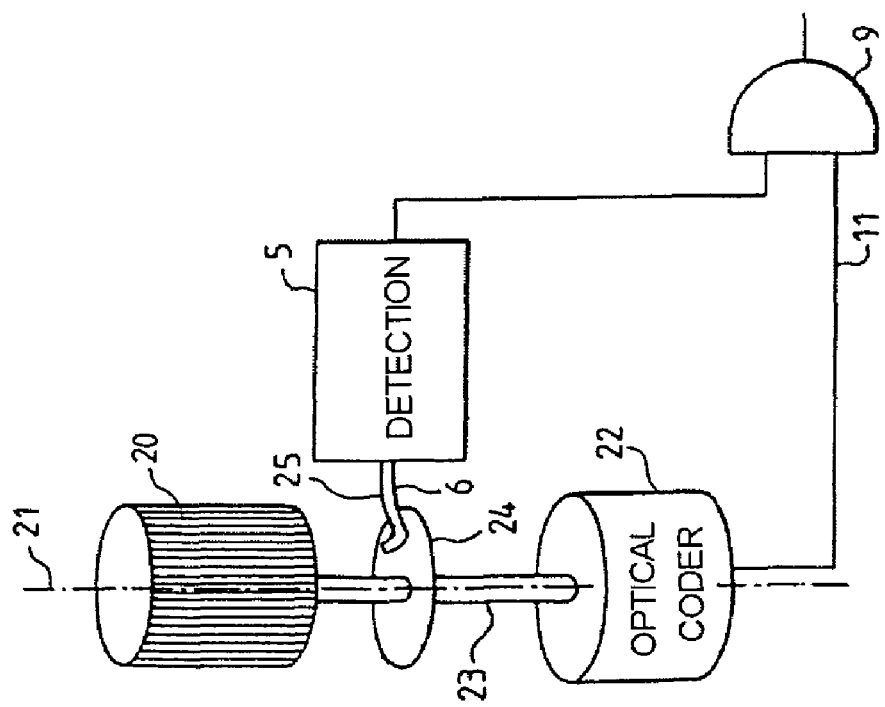
FIG. 2 shows a rotary knob.

FIG. 2 shows a variant embodiment of a device according to the invention. The mobile member in this case comprises a rotary knob 20 capable of rotating about an axis 21. The rotary knob 20 drives an optical coder 22 by the intermediary of a shaft 23 which extends along the axis 21. A contact plate 24 is mounted integral with the shaft 23, substantially perpendicular to the axis 21. The contact plate 24 rotates with the rotary knob 20. The outer surface of the rotary knob 20 is electrically conductive and is electrically connected to the contact plate 24. A finger 25 forms the input 6 of the detection means 5. The finger 25 is electrically conductive and is in permanent contact with the contact plate 24. Thus, whatever the angular position of the rotary knob 21 about the axis 20 may be, when an operator touches the rotary knob, the detection means 5 can deliver a signal corresponding to a possible contact between the operator and the rotary knob 21. Furthermore, the optical coder 22 delivers a signal representing the angular position of the rotary knob 20 about the axis 21 to the input 11 of the validation means 9.

Figure 3:
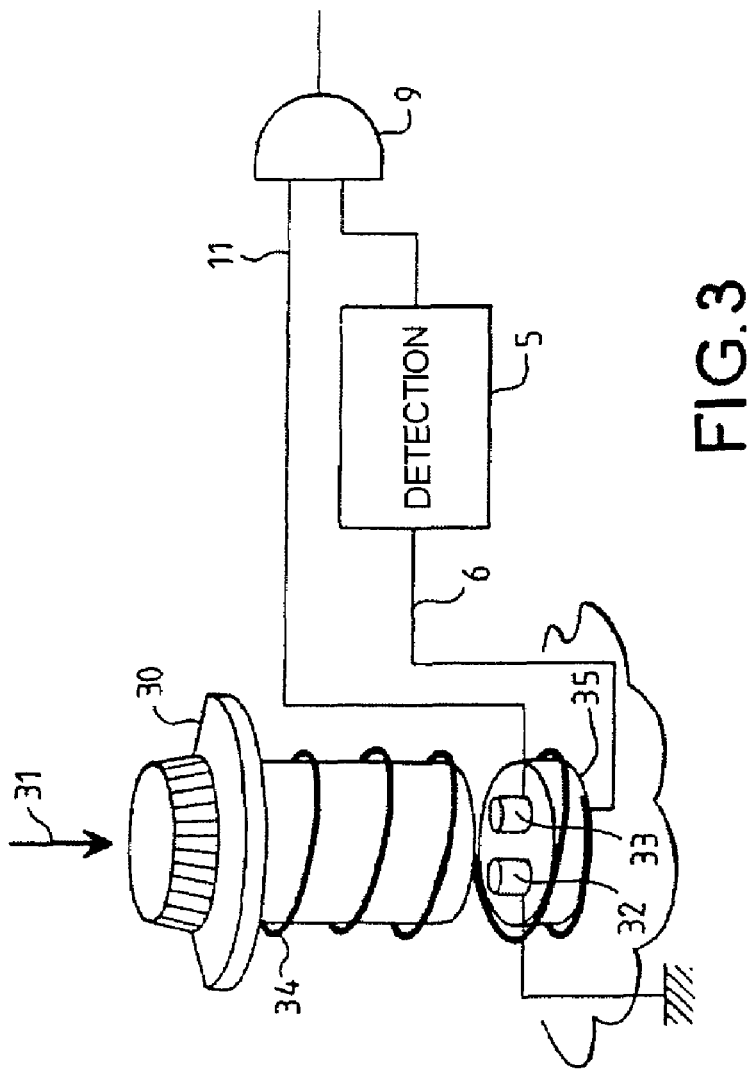
FIG. 3 shows a push-button.

FIG. 3 shows another variant of a device according to the invention. The mobile member in this case comprises a push button 30 that the operator can press in, in a direction symbolized by the arrow 31. When the push button 30 is pressed in, it electrically connects two contacts 32 and 33. A coil spring 34 keeps the push button 30 in the high position by opposing its pressing in, in the direction 31. The outer surface of the push button 30 is electrically conductive and is electrically connected to the spring 34, which is also electrically conductive.

The spring 34 bears on the one hand on the push button 30 and, on the other hand, on a fixed part 35. The contacts 32 and 33 are integral with the fixed part 35. The input 6 of the detection means is electrically connected to the end of the spring 34 bearing against the fixed part 35. The input 11 of the validation means 9 is electrically connected to the contact 33. As regards the contact 32, this is connected to ground. In this variant, the connections of the inputs 6 and 11 are made on immobile parts even when the operator maneuvers the push button 30.

Figure 4:
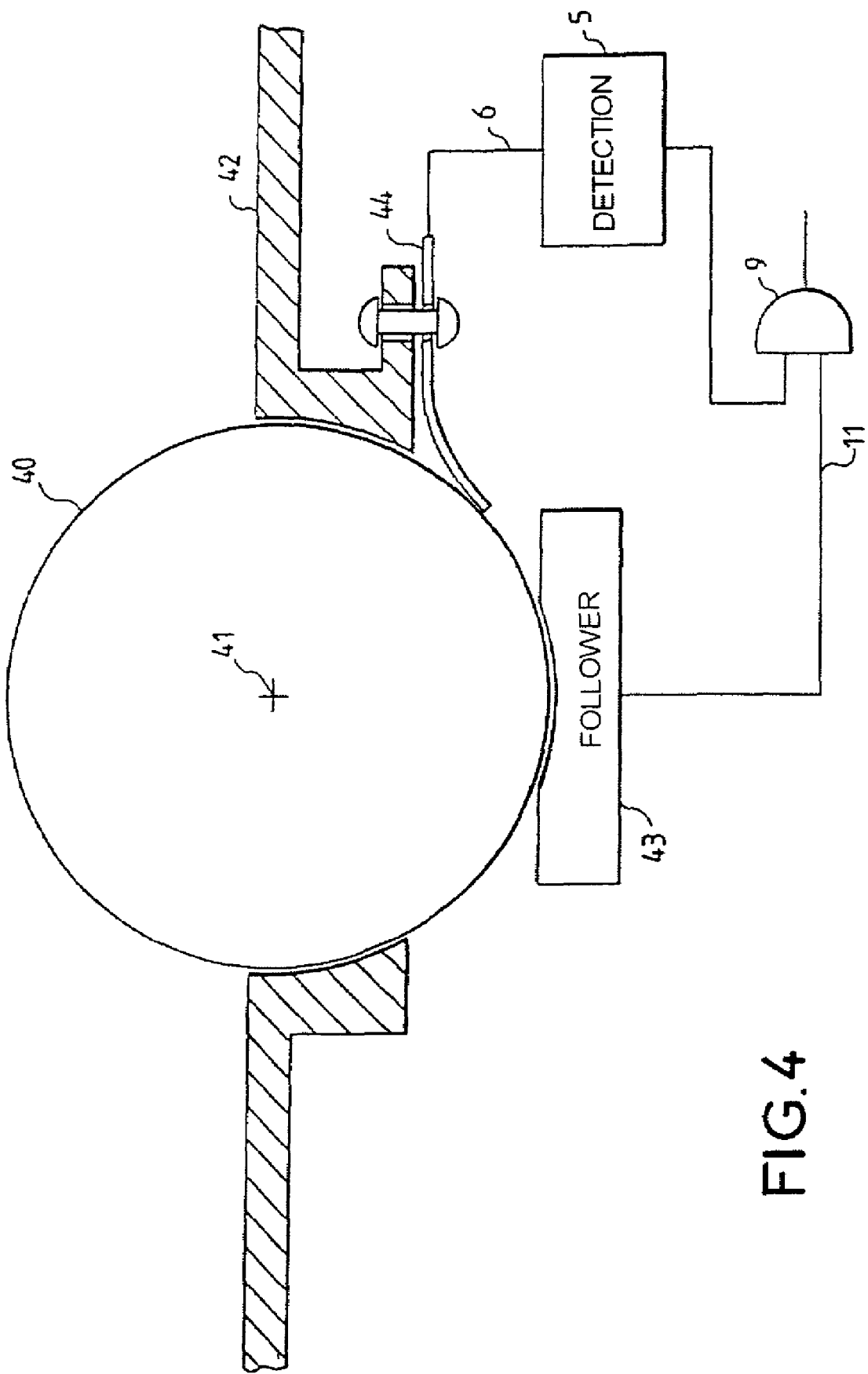
FIG. 4 shows a track ball.

In the variant shown in FIG. 4, the mobile member comprises a track ball 40 capable of rotating about its center 41. The track ball 40 is intended to be maneuvered by the hand of an operator, for example in order to move a cursor on a computer screen. The track ball 40 is guided in its rotational movements by a casing 42. The movements of the track ball 40 are converted into electrical data by means of a follower 43. This electrical data is supplied to the input 11 of the validation means 9. The outer surface of the track ball 40 is electrically conductive. A strip 44, integral with the casing 42, is in permanent contact with the outer surface of the track ball 40 such that the operator's hand is in electrical contact with the input 6 of the detection means 5 when he is touching the track ball 40.

FIG. 5 shows again the various components shown in FIG. 1 and gives details of an example embodiment of the detection means 5. It is of course possible to replace the switch 1, shown in FIG. 5, in particular by one of the other data input devices shown in FIGS. 2 to 4.

Figure 5:
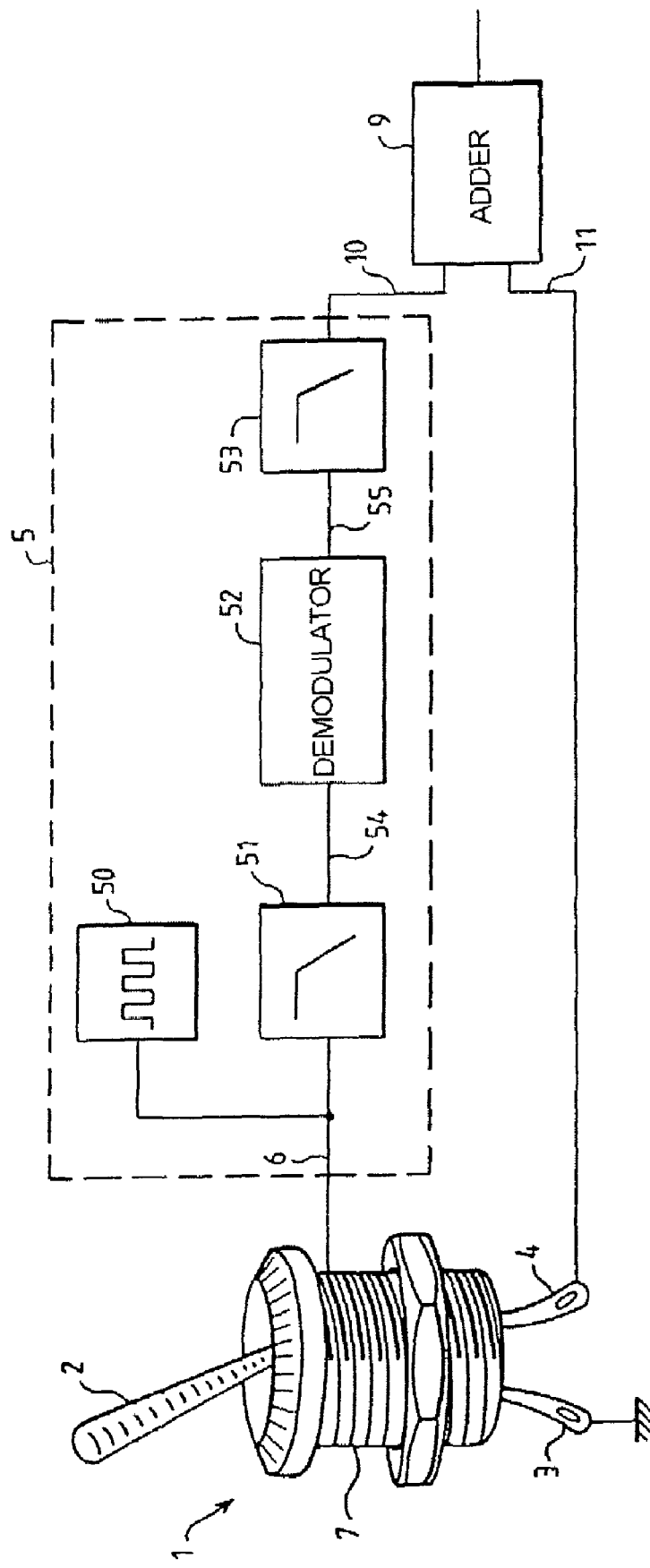
FIG. 5 shows details of an example of embodiment of the detection means.

The detection means 5, shown in FIG. 5, comprise a clock 50 delivering a clock signal to the input 6. The detection means 5 also comprise a first low pass filter 51, a demodulator 52 and a second low pass filter 53. When an operator is in contact with the mobile member 2, the input 6 is grounded by the intermediary of the operator and the clock signal is very highly attenuated. The input 6 also forms the input of the first low pass filter 51. The function of this filter 51 is to eliminate possible high frequency interference signals which could be superimposed on the signal present on the input 6, the mobile member 2 being capable of acting as an antenna picking up such interference signals. The cut off frequency of the filter 51 is, for example, of the order of a few tens of megahertz and is, in any case, higher than the frequency of the clock signal. An output 54 of the filter 51 also represents the input of the demodulator 52 whose function is to deliver on its output 55 an envelope signal of the signal present on the input 6. More precisely, when the clock signal is not attenuated, the signal present on the output 55 is at a high logic level. Conversely, when the clock signal is attenuated by a contact between the operator and the mobile member 2, the clock signal is at a low logic level. The output 55 forms the input of the second low pass filter 53. The function of this filter 53 is to prevent changes of state of short duration of the output signal of the detection means 5 from being taken into account. For example, the detection means must not take into account a simple rapid brushing of the mobile member 2 by the operator. The cut off frequency of the second low pass filter 52 is, for example, of the order of a few tens of hertz.

The output of the low pass filter 53 forms the output 8 of the detection means 5 which is connected to the input 10 of the validation means 9. The validation means 9 comprise, for example, an adder adding the signals present on the two inputs 10 and 11.

The invention claimed is:

1. A device for inputting data to an item of equipment comprising:
   a mobile member intended to be moved by an operator, the input data being dependent on the movement of the mobile member,
   detection means providing information representing the existence or non-existence of a contact between the operator and the mobile member, the contact with the operator being the normal contact the operator makes in order to move the mobile member, and
   validation means receiving the said information and the said input data, and in that the validation means supply the said input data to the equipment only when the information represents the existence of a contact between the operator and the mobile member;
   wherein the detection means detects ground signal continuity between the mobile member and the operator; and
   wherein the detection means comprises means for eliminating high frequency interference signals superimposed on a signal present on an input of the detection means.

2. The device as claimed in claim 1, wherein the validation means comprises means of delivering the data existing at the time of the last detection of presence of the operator.

3. The device as claimed in claim 1, wherein an input of the detection means is electrically connected to an electrically conductive surface of the mobile member.

4. The device as claimed in claim 3, wherein the mobile member comprises a rotary knob and a contact plate integral with the rotary knob, the device comprising a finger forming an input of the detection means and in that the finger is in permanent contact with the contact plate.

5. The device as claimed in claim 3, wherein the mobile member comprises a push button, in that a spring opposes a pushing in of the push button by the operator, and in that the spring electrically connects an outer surface of the push button to an input of the detection means.

6. The device as claimed in claim 3, wherein the mobile member comprises a track ball of which an outer surface is electrically conductive, and in that it comprises means for keeping the outer surface of the track ball in contact with an input of the detection means.

7. The device as claimed in claim 1, wherein the mobile member comprises a rotary knob and a contact plate integral with the rotary knob, the device comprising a finger forming an input of the detection means and in that the finger is in permanent contact with the contact plate.

8. The device as claimed in claim 7, wherein an angular position of the rotary knob is transmitted to the validation means by an optical coder.

9. The device as claimed in claim 1, wherein the mobile member comprises a push button, in that a spring opposes a pushing in of the push button by the operator, and in that the spring electrically connects an outer surface of the push button to an input of the detection means.

10. The device as claimed in claim 9, wherein the detection means comprise a clock whose output signal is attenuated when the operator is in contact with the mobile member.

11. The device as claimed in claim 9, wherein the mobile member comprises a track ball of which an outer surface is electrically conductive, and in that it comprises means for keeping the outer surface of the track ball in contact with an input of the detection means.

12. The device as claimed in claim 1, wherein the mobile member comprises a track ball of which an outer surface is electrically conductive, and in that it comprises means for keeping the outer surface of the track ball in contact with an input of the detection means.

13. The device as claimed in claim 1, wherein the detection means comprise a clock whose output signal is attenuated when the operator is in contact with the mobile member.

14. The device as claimed in claim 13, wherein the detection means comprise means for delivering an envelope signal of the clock signal.

15. The device as claimed in claim 13, wherein the detection means comprise means for preventing changes of state of short duration of an output signal of the detection means from being taken into account by the validation means.

16. The device as claimed in claim 13, wherein the validation means comprise an adder adding an output signal of the detection means and data.

17. The device as claimed in claim 1, wherein the detection means detects a predetermined resistance measured between the mobile member and a ground potential as provided by the operator being in contact with the mobile member.

18. The device as claimed in claim 17, wherein the predetermined resistance is approximately 2 kilohms.

* * * * *